June 5, 1962 C. T. YOUNG ET AL 3,038,036
MAGNETIC ERASE MEANS
Filed June 14, 1957

*INVENTORS*
CARL T. YOUNG
STEPHEN BESPALKO
*BY* Charles P. Boberg
ATTORNEY 3,038,036

MAGNETIC ERASE MEANS

Carl T. Young, Binghamton, and Stephen Bespalko, Vestal, N.Y., assignors to International Business Machines Corporation, New York, N.Y., a corporation of New York Filed June 14, 1957, Ser. No. 665,733
2 Claims. (Cl. 179—100.2)

This invention relates to devices for magnetically biasing or for demagnetizing objects such as magnetic drums and other moving magnetic media.

The process of demagnetizing or biasing a magnetic drum involves a number of special problems which in the past have proved quite troublesome. For example, any deviations of the drum surface from perfect concentricity will tend to produce variations of the residual magnetism in the drum surface, thereby affecting the accuracy with which recorded information may later be read from the drum. Furthermore, any non-linearity of the recording and pickup devices and their associated circuits will tend further to complicate the demagnetizing process and make it difficult to adjust the bias level of the drum accurately. Prior devices for biasing magnetic drums have not been well adapted to meet problems of this character. Consequently, the process of demagnetizing or biasing a drum has been regarded heretofore as a very difficult and time-consuming operation, with unpredictable results.

The terms "biasing" and "demagnetizing" are used interchangeably herein to denote the process of restoring a magnetized object such as a drum to a desired, uniform state of residual magnetism, generally referred to as its "bias." In some instances it may be desired that the bias level be zero, but in most cases it is preferred that some small bias be left on the drum to compensate for certain known variations in the recording and pickup circuits. While the invention has particular application to the biasing of magnetic drums in data processing systems, it obviously can be applied also to the demagnetization or biasing of other moving magnetic media as well.

A general object of this invention is to provide a novel magnetic bias control which aviods the above-mentioned disadvantages of prior devices.

Specifically, it is an object to provide a drum bias control which gives satisfactory and predictable results, is economical to build and easy to operate, and which requires very little time to perform its biasing function, regardless of any eccentricity or other irregularity that the drum surface may have.

Another object is to provide a drum bias control which can be readily and accurately adjusted to give the desired bias level despite the unavoidable non-linearity and variations of the read-write circuits and their components.

A further object is to provide a drum bias control of the aforesaid character which is adapted to utilize any of the usual recording heads of the drum for biasing the drum tracks individually.

The invention features a novel type of full-wave rectifier which is adjustable to control the relative magnitude or ratio of the positive and negative portions of the rectified voltage wave. The rectified positive and negative voltage wave portions can be made sufficiently large to demagnetize those parts of the drum surface which "run out" or recede away from the recording head due to the eccentricity of the drum surface, and by controlling the relative magnitude of these positive and negative voltages (an easy matter with the present invention), one is able to control the resultant bias quite effectively and accurately.

Other objects, features and advantages of the invention will be apparent from the following description and claims when studied in conjunction with the accompanying drawings, wherein several exemplary embodiments of the invention are disclosed.

Figure 1:
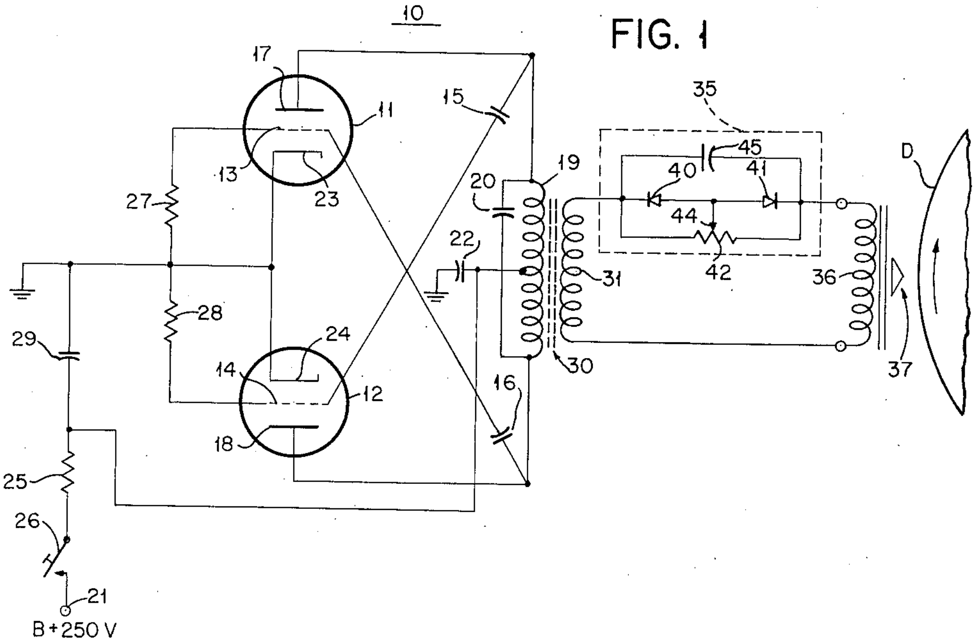
FIG. 1 is a circuit diagram illustrating one embodiment of the invention in which radio-frequency oscillations are utilized to demagnetize the drum, said embodiment including an automatic "cycle down" means for progressively diminishing the amplitude of the oscillations as the final step of the demagnetizing operation.

Referring now more specifically to FIG. 1, the circuit therein illustrated includes a push-pull radio-frequency oscillator, generally designated 10, having a pair of amplifier tubes 11 and 12 whose grids 13 and 14, are cross-coupled by capacitors 15 and 16, respectively, to the plates 18 and 17 of said tubes 12 and 11. These plates 17 and 18 also are connected to the opposite ends of a tank circuit comprising the coil or inductor 19 and the capacitor 20. The center tap of the coil 19 is connected through a resistor 25 and a switch 26 to a source of positive plate voltage, indicated by the terminal 21, and it also is coupled through a bypass capacitor 22 to ground.

The cathodes 23 and 24 of the tubes 11 and 12 are grounded as shown. The grids 13 and 14, respectively, are connected through their resistors 27 and 28 to ground. A capacitor 29 is connected as shown between the upper end of the resistor 25 and ground. In a manner which will be explained presently, the capacitor 29 automatically effects a progressive diminution of radio-frequency oscillations as the demagnetizing operation proceeds to its conclusion.

When the switch 26 is closed, radio-frequency oscillations are generated within the oscillator tank circuit comprising the coil 19 and capacitor 20. The coil 19 is the primary of a radio-frequency transformer 30 which has a ferrite core and a secondary winding or coil 31 associated therewith. The alternating radio-frequency voltage induced in the coil 31 is applied through a series-connected full-wave rectifier network, indicated generally by the dotted rectangle 35, to the winding 36 of the magnetic recording head 37, which is associated with the magnetic drum D or other moving magnetic object that is to undergo demagnetization. The winding 36 is energized by the positive and negative portions of the rectified voltage wave, and due to a novel voltage dividing feature of the rectifier network 35, the relative magnitude or ratio of these positive and negative voltages can be varied selectively to produce a desired magnetic bias on the drum D. This feature will be explained in greater detail presently.

The magnetic head 37 need not be a special head employed for biasing purposes only. It may be any one of the heads which normally are employed to record information on the drum D. In conjunction with the illustrated circuit, it may be utilized also to apply the desired magnetic bias to the associated recording track on the drum. Each head such as 37 will control the biasing of its particular track only.

The full-wave rectifier network 35 includes two oppositely-directed diode rectifiers 40 and 41, whose anode terminals are connected in common to the movable contact or tap 44 of a potentiometer 42. The stationary terminals of the potentiometer 42 are connected respectively to the cathode terminals of the diodes 40 and 41. The cathode terminal of the diode 40 also is connected to one end of the coil 31, while the cathode terminal of the other diode 41 is connected to an end of the winding 36. The opposite ends of the coil 31 and winding 36 are connected directly together. A small capacitor 45 connected in parallel with the potentiometer 42 bypasses a portion of the radio-frequency current and serves to smoothen the operation of the device.

During each half-cycle of the alternating voltage which is supplied to the coil 31 by the radio-frequency oscillator 10, only one of the rectifiers 40 and 41 is conductive. If the movable tap 44 of the potentiometer 42 is in its center position, the resistance interposed in series with the diode 40 during its conductive half-cycle is equal to the resistance interposed in series with the other diode 41 during its conductive half-cycle. Under these circumstances, the rectified positive and negative portions of the applied voltage wave will be of equal magnitude, resulting in a zero direct-current component and therefore zero bias. If the potentiometer tap 44 is adjusted so that less resistance is in series with one or the other of the diodes, the magnitude of the rectified positive and negative voltages will be unequal so that a bias other than zero will result.

As the drum surface D (fragmentarily represented in FIG. 1) passes under the head 37, it is subjected to the alternating magnetic field set up by the alternate positive and negative rectified voltages in the winding 36. Depending upon the adjustment of the potentiometer 42, the alternating magnetic field set up by the head 37 will tend to demagnetize the drum track completely, or it will apply to the drum track a magnetic bias having a certain magnitude and polarity. With the novel arrangement illustrated in FIG. 1, it is a simple matter to adjust and calibrate the potentiometer 42 to impart the desired sense and degree of magnetic bias to the drum track.

As mentioned hereinabove, one of the problems encountered in demagnetizing a drum or other moving magnetic medium is the unavoidable variation in spacing between the magnetic surface and the head which is produced by eccentricity or other irregularity of the surface while the medium is in motion. However, by making the applied alternating voltage of sufficient amplitude, the rectified positive and negative voltage wave portions supplied to the winding 36 will be of sufficient intensity to demagnetize even those parts of the surface which recede the most from the head 37 as they pass by it. All parts of the surface are subjected to alternating positive and negative voltages whose magnitudes are in the correct proportion to produce the desired direct-current component for biasing the surface of the drum or other magnetic medium. It is this ability to proportion the rectified positive and negative voltages relative to each other in the desired manner which enables the present invention to accomplish its biasing function so expeditiously. The illustrated arrangement affords an accuracy of adjustment which is unique and which does not require repeated cut-and-try efforts. In practice it has been found that a few passes of the drum track beneath the head are sufficient to produce the desired amount of bias.

Figure 3:
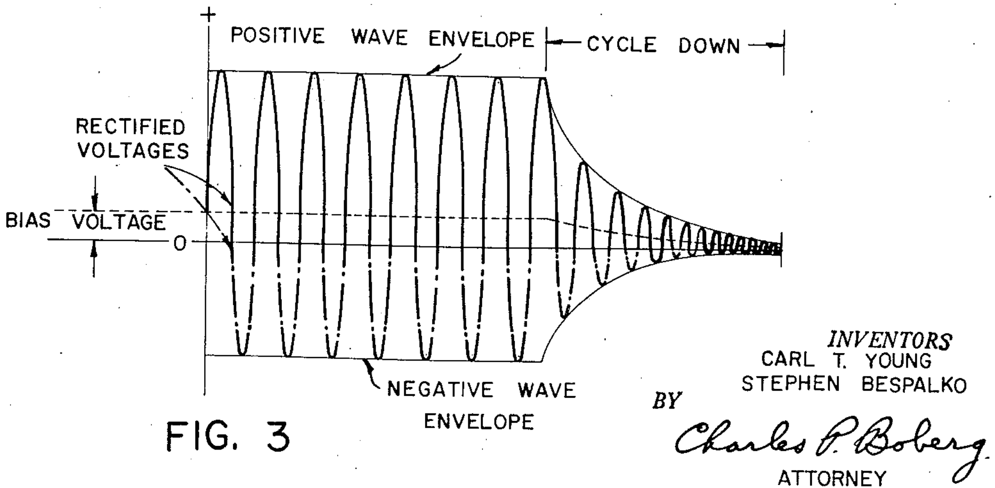
FIG. 3 is a time-voltage diagram showing the operation of the illustrated apparatus.

FIG. 3 indicates the relationships which exist between the rectified positive wave portions (solid loops) and the rectified negative wave portions (dot-dash loops) to produce a given bias voltage, as indicated by the dotted line. The terms "positive" and "negative" are arbitrary, of course, merely referring to the two opposite directions of the alternating voltage. The level of the bias voltage depends upon the relative magnitude of the positive and negative loops, which is dependent in turn upon the setting of the potentiometer 42, FIG. 1. For clarity of illustration the radio-frequency component of the voltage bypassed by the capacitor 45 is omitted from the diagram in FIG. 3.

In demagnetizing an object, it is customary to decrease the intensity of the magnetic field gradually as the final step of the demagnetizing operation. This sometimes is referred to as "cycling down." In the circuit of FIG. 1, automatic "cycle down" means are provided for progressively reducing the amplitude of the radio-frequency oscillations. It will be noted that when the switch 26 was closed, the capacitor 29 charged to the voltage level of the plate supply less the voltage drop in the plate resistor 25. When the drum D has been exposed sufficiently to the full-strength demagnetizing field, the switch 26 is opened. Thereupon the capacitor 29 commences to discharge, and in so doing it maintains the oscillator 10 in a state of progressively diminishing oscillation, the amplitude of the oscillations decreasing as the capacitor 29 discharges in the manner indicated by FIG. 3. This has the desired effect of progressively reducing the strength of the demagnetizing field at the head 37.

During the cycle-down period the positive and negative wave envelopes, FIG. 3, decay in an exponential fashion until the amplitude of the tank voltage no longer is sufficient to maintain oscillations in the oscillator 10, FIG. 1. The bias voltage is maintained at an even level until cycling down commences; whereupon it follows a smooth exponential decay curve, FIG. 3, until the oscillations cease. The magnetic bias left on the drum surface corresponds to the magnitude of the bias voltage before cycling down commenced.

Typical circuit data for the radio-frequency device illustrated in FIG. 1 are as follows:

| | | |
|---|---|---|
| Tubes **11** and **12** | type | 6350 |
| Capacitor **20** | mf | 200 |
| Capacitors **15** and **16** | mf | 68 |
| Capacitor **22** | mf | .01 |
| Capacitor **29** | mf | 30 |
| Resistor **25** | ohms | 470 |
| Resistors **27** and **28** | do | 33,000 |
| Diodes **40** and **41** | type | 1N91 |
| Resistor **42** | ohms | 250 |
| Capacitor **45** | mf | .01 |
| Plate supply voltage | volts | 250 |
| Frequency of oscillations | kc | 330 |

With the values stated for the resistor 25 and capacitor 29, the cycling-down time is on the order of 1 to 3 seconds.

Figure 2:
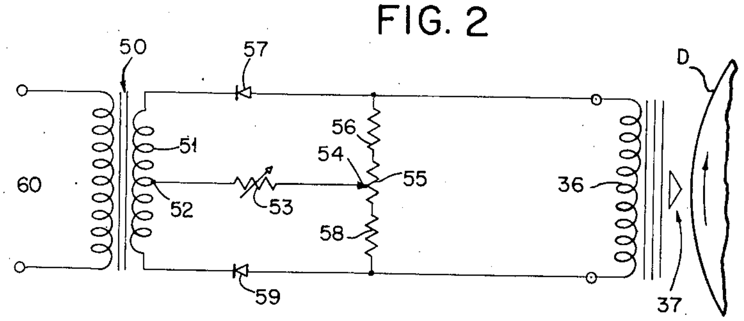
FIG. 2 is a circuit diagram illustrating another embodiment of the invention which is adapted to operate at lower frequency and which has a manually operable "cycle down" means.

A different form of the invention is illustrated in FIG. 2. This embodiment may be utilized in conjunction with a source of low-frequency alternating voltage, such as an ordinary 60-cycle power source. Instead of an automatic cycle-down control, a manually operable cycle-down control is provided.

Referring now in detail to FIG. 2, alternating voltage from a 60-cycle source or other suitable low-frequency source is supplied through a transformer 50 to a center-tapped secondary winding 51. The center tap 52 of the secondary winding 51 is connected through a variable resistor 53 to the movable contact 54 of a potentiometer 55. One of the stationary terminals of the potentiometer 55 is connected through a resistor 56 to the anode terminal of a diode rectifier 57 and also to one end of the winding 36 in the magnetic head 37. The other stationary terminal of the potentiometer 55 is connected through a resistor 58 to the anode terminal of another diode rectifier 59 and also to the opposite end of the winding 36. The cathode terminals of the diodes 57 and 59 are connected respectively to opposite ends of the secondary winding 51 on the transformer 50.

The device illustrated in FIG. 2 operates in a manner similar to that of the device illustrated in FIG. 1. The alternating voltage supplied by the transformer 50 is rectified into positive and negative portions by the diodes 57 and 59, and the relative magnitude or ratio of these positive and negative voltage portions is determined by the setting of the potentiometer 54. Thus, the potentiometer setting actually determines the resultant bias applied to the drum D by the head 37.

The resistor 53 is initially adjusted so that the positive and negative voltages have sufficient strength to accomplish a complete demagnetization or biasing action upon all parts of the drum track. To "cycle down" the device, the resistor 53 gradually is turned toward its high-resistance setting. This causes the amplitudes of the positive and negative demagnetizing voltages to diminish progressively, leaving the drum track at the desired bias level.

The time-voltage diagram of FIG. 3, while it applies more particularly to the embodiment shown in FIG. 1, also may be considered to represent an idealized functioning of the embodiment shown in FIG. 2, assuming it were possible to vary the resistance 53 in a smooth exponential fashion. In practice, of course, the operator's manipulation of the manually settable resistor 53 determines the exact manner in which the bias voltage will decay during this cycle-down period.

Typical circuit data for the low-frequency arrangement illustrated in FIG. 2 are as follows:

| | |
|---|---|
| Transformer **50** | 6.3 volt filament transformer. |
| Diodes **57** and **59** | Type 1N91. |
| Resistor **55** | 6 ohms. |
| Resistors **56** and **58** | 47 ohms. |
| Resistor **53** | 100 ohms maximum. |

Each of the embodiments illustrated in FIGS. 1 and 2 affords a magnetic bias control which is economical to construct, easy to operate and dependable in performance. The two illustrated embodiments involve a common principle of full-wave rectification with variable control of the ratio between the positive and negative rectified voltages. Utilization of this principle enables the drum or other moving magnetic object to be biased accurately in only a fraction of the time formerly required for this task, and with greater uniformity of results.

While there have been shown and described and pointed out the fundamental novel features of the invention as applied to several preferred embodiments thereof, it will be understood that various omissions and substitutions and changes in the form and details of the devices illustrated and in their operation may be made by those skilled in the art, without departing from the spirit of the invention. It is the intention, therefore, to be limited only as indicated by the scope of the claims appended hereto.

The invention is claimed as follows:

1. In a magnetic recording apparatus having a head which is electrically energizable for recording magnetically upon a moving magnetic medium, a device adapted to be energized by an alternating voltage wave applied thereto for imparting a desired magnetic bias to said magnetic medium comprising, in combination with said head, means for rectifying the alternating voltage wave into positive and negative wave portions, means for applying the rectified positive and negative voltage wave portions to said head for energizing the same, adjustable means for controlling the relative magnitude of the rectified positive and negative voltage wave portions thereby to determine the polarity and magnitude of the bias which is imparted to the magnetic medium by said head, and additional voltage controlling means for progressively and concurrently diminishing the respective amplitudes of the rectified positive and negative voltage wave portions.

2. Apparatus for applying a selected magnetic bias to a magnetic drum or the like comprising a magnetic head having a winding which is electrically energizable for causing said head to magnetize the surface of the drum, a center-tapped source of alternating voltage, a pair of diodes, a potentiometer having a resistance whose opposite extremities are connected respectively through said diodes to the opposite poles of said source and having a movable contact connected to the center tap of said source, said diodes being oppositely directed with respect to said source to afford full-wave rectification of the alternating voltage, and means connecting the opposite extremities of said potentiometer resistance respectively to the terminals of said head winding, the arrangement being such that the setting of said movable potentiometer contact determines the ratio of the rectified positive and negative portions of the alternating voltage thereby controlling the polarity and magnitude of the bias applied to the drum surface by said head.

References Cited in the file of this patent

UNITED STATES PATENTS

| | | |
|---|---|---|
| 2,207,392 | Zuschlag | July 9, 1940 |
| 2,282,105 | Tunick | May 5, 1942 |
| 2,355,940 | Zuschlag | Aug. 15, 1944 |
| 2,397,497 | Mages | Apr. 2, 1946 |
| 2,423,225 | Chapin | July 1, 1947 |
| 2,596,621 | Van Loon et al. | May 13, 1952 |
| 2,620,403 | Howey | Dec. 2, 1952 |
| 2,657,277 | Brastad | Oct. 27, 1953 |

FOREIGN PATENTS

| | | |
|---|---|---|
| 719,281 | Great Britain | Dec. 1, 1954 |